(12) United States Patent
Wootten (10) Patent No.: US 10,344,467 B1
(45) Date of Patent: Jul. 9, 2019

(54) GLIDE RAIL

(71) Applicant: Bryx Group LLC, North Olmsted, OH (US)

(72) Inventor: John Mark Wootten, North Olmsted, OH (US)

(73) Assignee: BRYX GROUP LLC, North Olmsted, OH (US)

( * ) Notice: Subject to any disclaimer, the term of this patent is extended or adjusted under 35 U.S.C. 154(b) by 353 days.

(21) Appl. No.: 14/824,115

(22) Filed: Aug. 12, 2015

Related U.S. Application Data (60) Provisional application No. 62/036,246, filed on Aug. 12, 2014.

(51) Int. Cl.
  *F16M 13/02* (2006.01)
  *E03F 5/22* (2006.01)
  *F04B 23/02* (2006.01)

(52) U.S. Cl.
  CPC ............. *E03F 5/22* (2013.01); *F16M 13/02* (2013.01); *F04B 23/021* (2013.01)

(58) Field of Classification Search
  CPC ......... E03F 5/22; F16M 13/02; E04B 1/4107; F04D 13/16; F04D 13/086
  USPC ........................................... 417/360
  See application file for complete search history.

(56) References Cited

U.S. PATENT DOCUMENTS

| | | | | |
|---|---|---|---|---|
| 1,768,246 A | * | 6/1930 | Gaddis | E04B 1/4107 52/699 |
| 2,087,941 A | * | 7/1937 | Weaver | A47L 3/00 52/710 |
| 2,639,789 A | * | 5/1953 | Rosenberg | A47B 9/20 108/148 |
| 3,018,925 A | * | 1/1962 | Englesson | F04D 29/607 222/180 |
| 3,333,364 A | * | 8/1967 | Herr | E06B 3/44 126/343.5 R |
| 3,458,052 A | * | 7/1969 | Kann | A47B 57/54 108/148 |
| 3,466,066 A | * | 9/1969 | Dawson | F16L 13/00 285/286.2 |
| 3,534,517 A | * | 10/1970 | Kann | A47B 57/54 108/141 |
| 3,676,966 A | * | 7/1972 | Ragland | E06B 1/18 49/489.1 |
| 3,687,576 A | * | 8/1972 | Wikholm | F04D 29/607 222/385 |
| 3,743,447 A | | 7/1973 | Lynch | |
| 3,771,914 A | * | 11/1973 | Crespo | F04D 29/607 417/360 |

(Continued)

*Primary Examiner* — Peter J Bertheaud
*Assistant Examiner* — Geoffrey S Lee
(74) *Attorney, Agent, or Firm* — Luedeka Neely Group, PC (57) ABSTRACT

A submersible pump system including a pump base with a rail mounting point, a submersible pump configured to mate with to the pump base and to glide along a guide rail mounted to the rail mounting point, and a guide rail, made from one or more connected guide rail sections, defining a polygon shape and including a slot that extends between top and bottom ends of the guide rail. Brackets for connecting the guide rail to a vault may be attached to the slot of the rail. Additional mounting brackets or accessories may also be attached to the slot. The pump glides along the rail from the top of the vault to the bottom of the vault and automatically mates with the pump base.

16 Claims, 9 Drawing Sheets

(56) References Cited

U.S. PATENT DOCUMENTS

| | | | | |
|---|---|---|---|---|
| 3,771,915 A * | 11/1973 | Back | | F04D 29/607 |
| | | | | 417/360 |
| 3,880,553 A | 4/1975 | Wolford et al. | | |
| 3,885,714 A | 5/1975 | Sjostrand | | |
| 3,938,545 A * | 2/1976 | Nagy | | E02D 29/14 |
| | | | | 137/363 |
| 4,017,199 A * | 4/1977 | Strassle | | A47B 57/565 |
| | | | | 403/264 |
| 4,060,345 A * | 11/1977 | Blum | | F04D 29/607 |
| | | | | 417/360 |
| 4,178,139 A | 12/1979 | Seppanen et al. | | |
| 4,308,000 A * | 12/1981 | Oakes | | E03F 5/22 |
| | | | | 285/24 |
| 4,324,531 A | 4/1982 | Sarvanne | | |
| 4,354,655 A * | 10/1982 | Hengst | | F16B 37/045 |
| | | | | 248/676 |
| 4,392,790 A | 7/1983 | Shibata et al. | | |
| 4,506,935 A * | 3/1985 | Suzuki | | F16C 32/06 |
| | | | | 384/12 |
| 4,564,041 A * | 1/1986 | Kramer | | F16L 37/26 |
| | | | | 137/315.01 |
| 4,583,359 A * | 4/1986 | Staeger | | E04B 1/5837 |
| | | | | 52/653.2 |
| 4,661,047 A * | 4/1987 | Weis | | F04D 29/607 |
| | | | | 405/303 |
| 4,726,742 A | 2/1988 | Harbinson et al. | | |
| 4,881,707 A * | 11/1989 | Garfinkle | | G09F 7/22 |
| | | | | 248/222.12 |
| 4,886,426 A * | 12/1989 | Surinak | | E03F 5/22 |
| | | | | 285/24 |
| 4,948,313 A * | 8/1990 | Zankovich | | E04B 1/4107 |
| | | | | 411/103 |
| 4,978,233 A * | 12/1990 | Stotzel | | F16C 29/025 |
| | | | | 384/12 |
| 5,038,817 A * | 8/1991 | Henry | | F16L 37/26 |
| | | | | 137/315.29 |
| 5,287,612 A * | 2/1994 | Paddock | | B66C 1/24 |
| | | | | 269/46 |
| 5,507,628 A * | 4/1996 | Masse | | F04D 29/607 |
| | | | | 248/669 |
| 5,906,479 A * | 5/1999 | Hawes | | F04D 29/406 |
| | | | | 417/360 |
| 5,931,353 A * | 8/1999 | Guyomard | | B60K 15/03177 |
| | | | | 220/608 |
| 5,951,248 A * | 9/1999 | Hall | | F04D 29/605 |
| | | | | 248/65 |
| 6,059,208 A | 5/2000 | Struthers | | |
| 6,644,342 B1 * | 11/2003 | Bogan | | E02D 29/121 |
| | | | | 137/364 |
| 7,618,210 B2 * | 11/2009 | Wagner | | E04F 11/1836 |
| | | | | 403/306 |
| 7,735,270 B2 * | 6/2010 | Olle | | F16L 3/24 |
| | | | | 52/167.9 |
| 8,328,397 B2 * | 12/2012 | Long | | F21V 21/34 |
| | | | | 362/152 |
| 9,315,986 B2 * | 4/2016 | Oliveira | | E04B 1/4107 |
| 9,752,313 B2 * | 9/2017 | Simon | | E03F 3/046 |
| 2002/0114712 A1 * | 8/2002 | Maganhoto | | F04B 39/121 |
| | | | | 417/360 |
| 2006/0042879 A1 * | 3/2006 | Tepecik | | B66B 9/00 |
| | | | | 187/250 |
| 2010/0192505 A1 * | 8/2010 | Schaefer | | A47B 96/14 |
| | | | | 52/653.2 |
| 2012/0260599 A1 * | 10/2012 | Zambelli | | E04B 2/94 |
| | | | | 52/705 |
| 2017/0121151 A1 * | 5/2017 | Watanabe | | B66B 11/0045 |

* cited by examiner

GLIDE RAIL

CROSS-REFERENCE TO RELATED APPLICATIONS

This application claims the benefit of U.S. Provisional Application No. 62/036,246, filed Aug. 12, 2014 and entitled Glide Rail, the disclosure of which is incorporated by reference herein in its entirety.

FIELD OF THE INVENTION

This invention relates to the field of submersible pump systems. More particularly, this invention relates to a guide rail used in connection with an underground submersible pump system.

BACKGROUND AND SUMMARY

Various submersible pump systems are available for use in underground and other types of utility vaults. Some of these systems utilize two round pipes placed side-by-side as guide rails for raising and lower the pump into the vault. One end of these pipes is mounted to the top of pump bases and the opposing end is mounted to an opening at the top of the vault. The rails are inserted into guides located in the sides of the pump. When the pump is raised or lowered, the receiver glides along the rails. A disadvantage in using these types of pipes is the cost and waste associated with their use. In particular, 2-inch diameter pipe is commonly used for guide rails, but this type of pipe is often provided in 20-foot lengths, whereas industry standards and pump manufacturers require that each pipe section in a submersible pump system must be joined and supported every 10-15 feet using intermediate guide rail brackets. As such, each 20-foot section of 2-inch pipe must be cut to meet this requirement, which results in wasted excess piping.

Another disadvantage of pipes is that they are often difficult to transport and require special means of transportation, which adds to the costs of using pipes as rails. In particular, since pipes are often provided in a standard 20-foot length, it is difficult to transport the pipes in the bed of a standard work truck. As such, it was often necessary to arrange for the pipes to be shipped using special shipment, such as on a tractor-trailer truck.

A third disadvantage of pipes is the cost for their initial installation as well as the cost of their replacement. As explained above, the initial costs of installation are high due, in large part, to the wasted excess pipe. Also, recent changes in the industry have led to a decreased useful life for guide rails, which has increased the replacement costs. In particular, high efficiency toilets have recently become more popular in the industry. The use of high efficiency toilets, however, often results in a reduction in volume of water, increasing the percentage of organic solids and an increased in production of Hydrogen Sulfide ($H_2S$) gas in utility vaults. Hydrogen Sulfide gas is known to cause more rapid deterioration of traditional pipes, which has required that the pipes be replaced more often than was traditionally required. This has resulted in substantial additional costs associated with the use of pipes as guide rails for submersible pump systems.

Accordingly, due to changes in marketplace demand, industry standards, manufacturer requirements, technological improvements, etc., there is a need for an improved submersible pump guide rail system that offers improved functionality while remaining compatible with components of older pipe systems.

The above and other needs are met by a submersible pump system for use in guiding a submersible pump to a pump base. The system includes a pump base having an inlet and a first rail mounting point, a submersible pump having an outlet configured to mate with the inlet of the pump base and a first rail receiver configured to glide along a guide rail. The system is provided with a first elongate guide rail having a plurality of sides defining a polygon shape having an interior space, a top end, a bottom end, and first and second edges forming a slot therebetween that extends between the top and bottom ends of the guide rail, the first guide rail extending upwardly from the first mounting point.

In certain embodiments, the submersible pump system includes a first guide rail having a first flat side surface, a second flat side surface substantially parallel with the first flat side surface, a flat back surface disposed between the first and second flat surfaces and opposite from the slot, and outward-curving bends disposed between the back surface and the first and second side surfaces. Sometimes the first guide rail includes a plurality of adjacent first flat side surfaces angled with respect to one another and a plurality of adjacent second flat side surfaces angled with respect to one another. Wherein each one of the plurality of first flat side surfaces is parallel with one of the plurality of second flat side surfaces. And wherein the flat back surface is disposed between the plurality of first side surfaces and the plurality of second side surfaces. And wherein outward-curving bends are disposed between each of the adjacent first flat side surfaces and between each of the adjacent second flat side surfaces.

In certain embodiments, the first guide rail includes two or more guide rails abutting end-to-end and oriented so that the slots are aligned to form a single continuous slot along the entire length of the two or more guide rails. It also includes a rail sleeve having a polygonal outer wall having a top end and a bottom end and two or more openings disposed in the wall, wherein a rail sleeve is inserted into the interior space of the two or more guide rails at each abutment and is arranged so that the two or more openings face the slot of the two or more guide rails and at least one of the two or more openings is disposed on either side of the abutment. It also includes a threaded fastener disposed in each of the two or more openings and passing through the slot of each of the two or more guide rails and connected to a threaded nut.

In some embodiments, the submersible pump system includes a second elongate rail. A U-shaped rail bracket having a back surface, left and right sides extending away from the back surface, and at least two vertically-aligned attachment points disposed in each of the left and right sides connects the first and second elongate rails together. In particular, the first rail is mounted to the left side of the rail bracket by inserting a fastener through each of the at least two vertically-aligned attachment points, through the slot of each of the two or more guide rails and connected to a threaded nut. Similarly, the second rail is mounted to the right side of the rail bracket by inserting a fastener through each of the at least two vertically-aligned attachment points, through the slot of each of the two or more guide rails and connected to a threaded nut.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
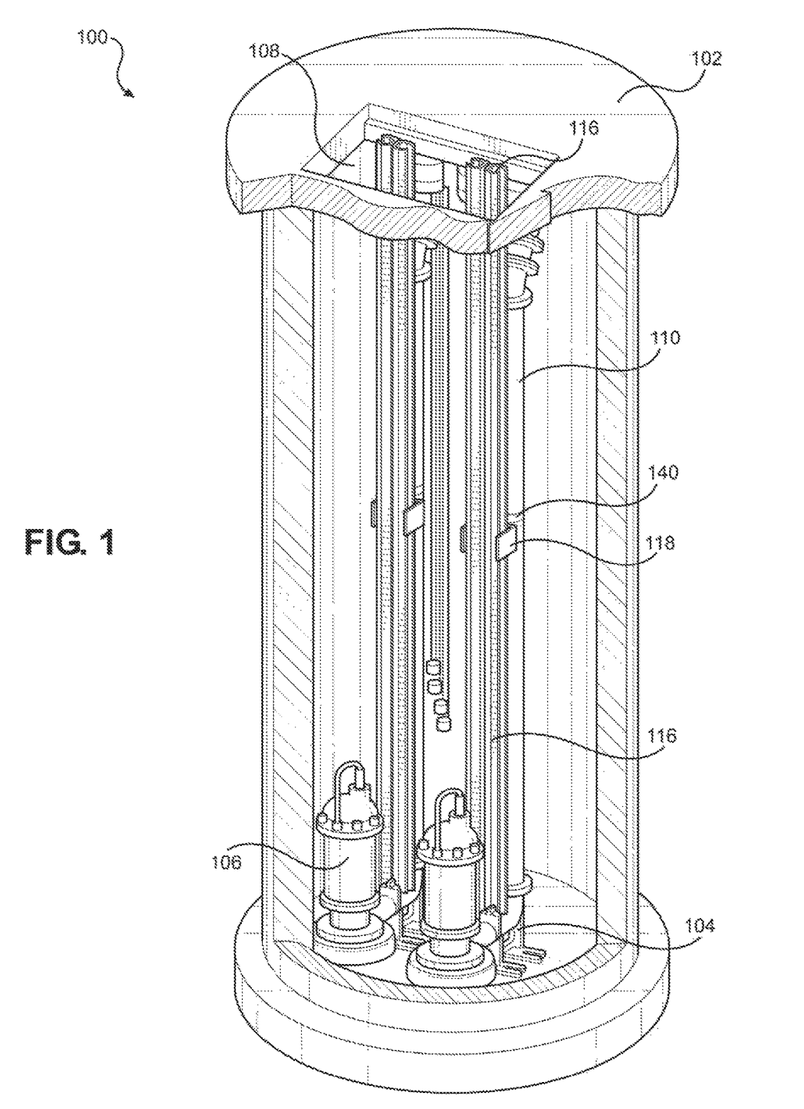
FIG. 1 is a perspective view depicting a vault having two pumps that are equipped with guide rails according to an embodiment of the present invention.
Figure 2:
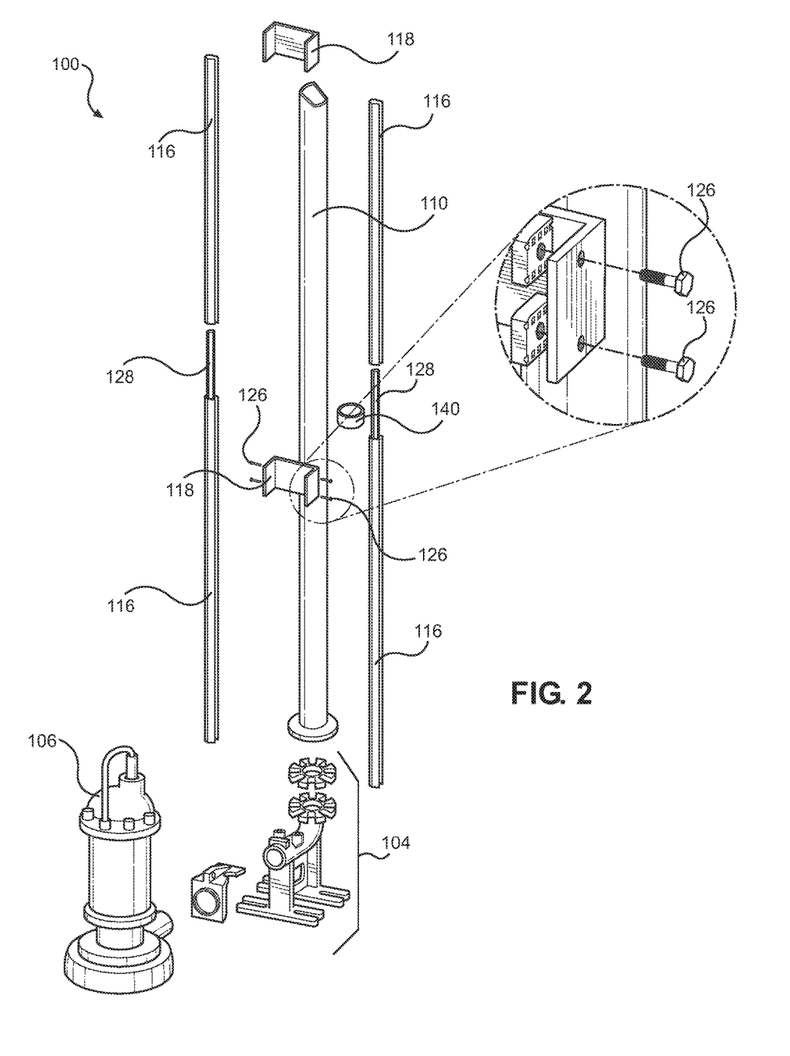
FIG. 2 is an exploded view of a pump, pump base and a guide rail according to an embodiment of the present invention.

Referring now to the drawings in which like reference characters designate like or corresponding characters throughout the several views, there is shown in FIGS. 1 and 2, a submersible pump system 100 according to an embodiment of the present invention. The pump system 100 includes a concrete utility vault 102 having a top and bottom end. Utility vaults 102 of this type are often used for storing and conveying of sewage or waste water. Pumps 106 are often permanently mounted in the utility vault 102 and automatically cycle to pump sewage or waste water through a network of pipes to a municipal or industrial pollution control or waste water treatment facility. It may be necessary to periodically remove these pumps for required maintenance, replacement or upgrades etc., submersible pump system 100 allows for the safe removal and replacement of pumps 106 without the requirement of service personnel entering the utility vault 102. This design reduces or eliminates the confined space entry hazards associated with human entry of the utility vault 102

Accordingly, the system 100 includes one or more pump bases 104, which are placed inside of the vault and are fixedly mounted to the floor surface at the bottom end of the vault. Each of the pump bases 104 connects a pump 106 to a discharge pipe 110. The discharge pipe 110 extends upwards away from the pump base 104 and exits the utility vault 102. In this particular view, the discharge pipe 110 extends almost to the top of the utility vault 102 before exiting though a sidewall of the vault. However, the discharge pipe 110 may exit at any location in the utility vault 102. The contents of the vault are pumped through the pump 106, then the pump base 104, then the discharge pipe 110, and then out of the utility vault 102.

The submersible pump 106 is removably mounted to an inlet of each pump base 104. The pumps 106 may be placed into or removed from the utility vault 102 by raising or lowering the pump through a vault access opening 108 located at the top end of the vault. Typically, the pump 106 is lowered through the opening 108 and then into position using a winch, a crane or some other type of lifting mechanism. A lifting point may be located on the top surface of the pump 106 for receiving a hook, strap, chain, etc. When the pump 106 is lowered into the vault 102, the inlet of the pump base 104 is configured to mate with an outlet of the submersible pump 106. Preferably, the pumps 106 mate automatically with the pump bases 104. For example, in certain embodiments, as the pump 106 is lowered, the inlet of the pump base and the outlet of the pump make initial contact at an initial contact point. As the pump is lowered further into the vault, the pump rotates about the initial contact point until the inlet of the pump base is fully seated with the outlet of the pump. In other embodiments, the inlet of the pump base and the outlet of the pump may align automatically be simply lowering the pump onto the inlet of the pump base. By automatically mating the pump 106 and pump base 104 together, the pump may be placed into service more quickly and personnel do not have to enter the vault 102 in order to connect the pump to the pump base.

It may be appreciated from the above discussion that, in order for the pump 106 and the pump base 104 to be automatically mated, they should be precisely aligned with one another so that the outlet of the pump 106 is aligned with the inlet of the pump base 104. Accordingly, with reference to FIGS. 1 and 3, the system 100 includes one or more guide rail sections 116 that extend vertically upwards from the pump base 104 and that are mounted adjacent the vault access opening 108. It is important that the rail 116 be mounted near the top of the vault 102 so that the pump 106 may be positioned onto the rails easily. The rails 116 may be mounted together along their length and to the top of the vault 102 near the vault access 108 by a variety of brackets, as discussed in greater detail below.

Figure 3:
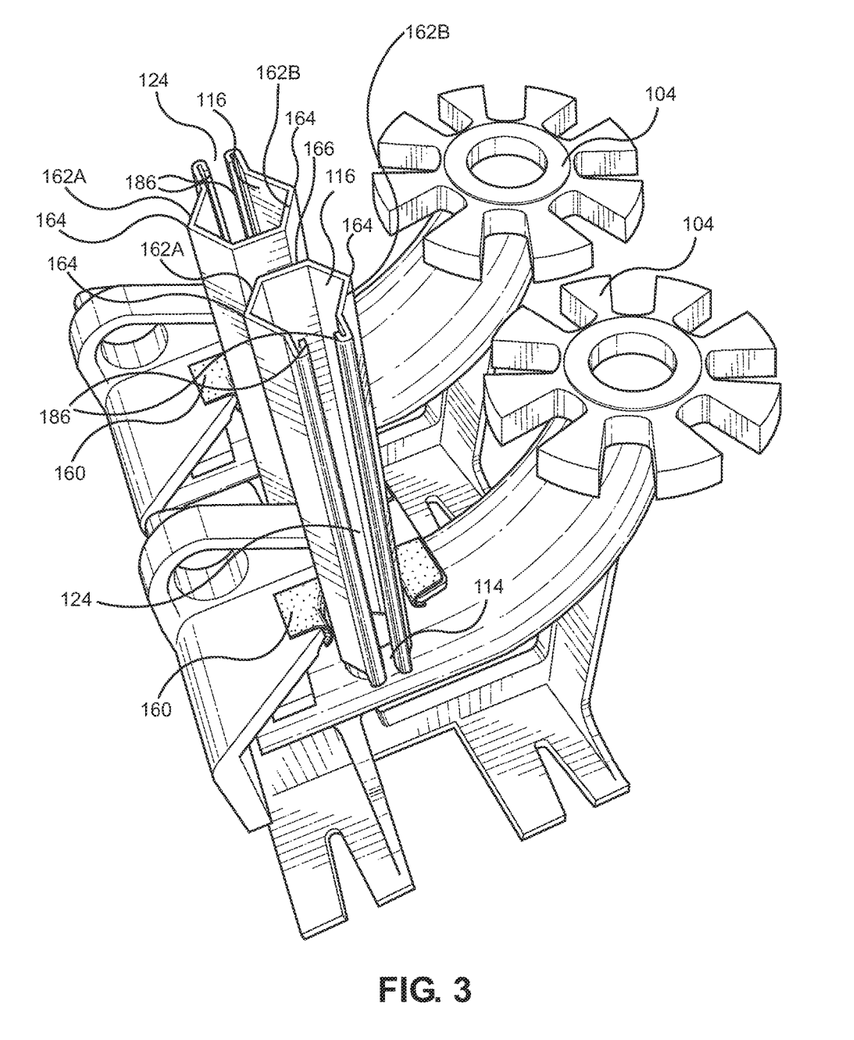
FIG. 3 is a perspective view depicting a pump, pump base and a guide rail according to an embodiment of the present invention.

The bottom of each of the rails 116 may be mounted to the pump base by a boss 114. In certain systems, the boss 114 extends vertically from the top surface of the pump base 104 and the rail 116 is inserted over the boss. In other systems, the boss 114 is a cup-like receiver that the rail 116 may be placed into. In preferred embodiments, it is not necessary to rigidly attach the bottom of the rails 116 to the boss 114. Rather, the bottom portions of the rails 116 connected to the boss 114 using one of the methods discussed above or other similar methods, and then the top portions of the rails are connected near the vault access 108 using a bracket, which fixes the entire rail 116 in place and eliminates the need for also rigidly fixing the bottom of the rails. This also eliminates the need for a worker to be physically present at the bottom of the vault 102 to secure the rail 116. Thus, mounting the rail 116 in at least these two locations secures the rails 116 vertically between the pump 106 and the top of the vault 102.

Figures 4A, 4B:
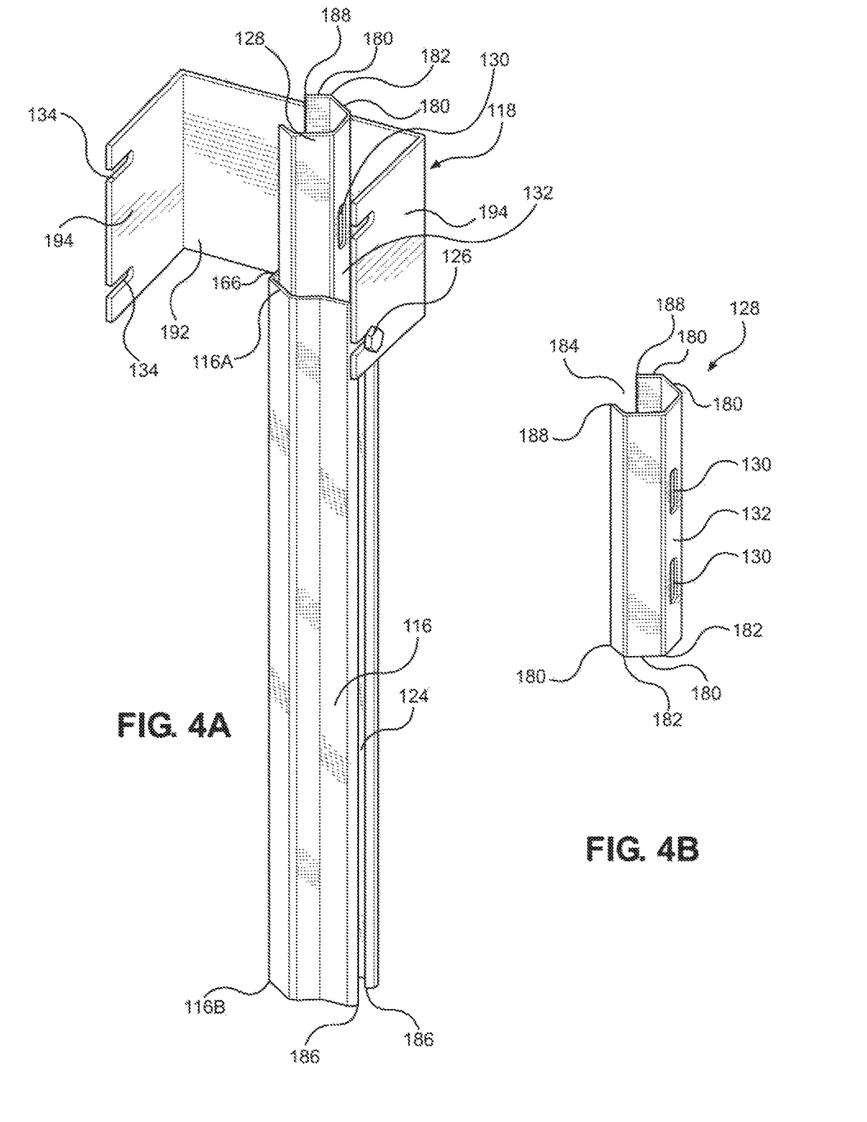
FIG. 4 is a perspective view depicting a guide rail mounted to a bracket and including a rail sleeve.

With reference to FIGS. 3 and 4, the rails 116 include a plurality of sides that define a polygonal cross section having an interior space and inner edges 186, which define a slot 124 that extends between a top end 116A and a bottom end 116B of the rail. The slot 124 is sized to allow a bolt 126 to pass through but is narrow enough to prevent a nut 138 from passing through. Preferably, the rail 116 includes a first side surface 162A and a second side surface 162B that are parallel to one another. In certain embodiments, each of the first and second side surfaces 162A, 162B includes a plurality of adjacent flat surfaces. In particular, the first side surface 162A is made up of two or more surfaces that are angled with respect to one another and that are joined together by outward bending curves 164. Similarly, the second side surface 162B is made up of two or more surfaces that are angled with respect to one another and that are joined together by outward bending curves 164. Each of the surfaces of the first side surface 162A may be parallel with one of the surfaces of the second side surface 162B. Preferably, the angle between adjacent surfaces of the rail 116 is between about 60 degrees and less than about 180 degrees. More preferably, the angle between adjacent surfaces of the rail is between about 90 degrees and about 150 degrees.

Figure 8:
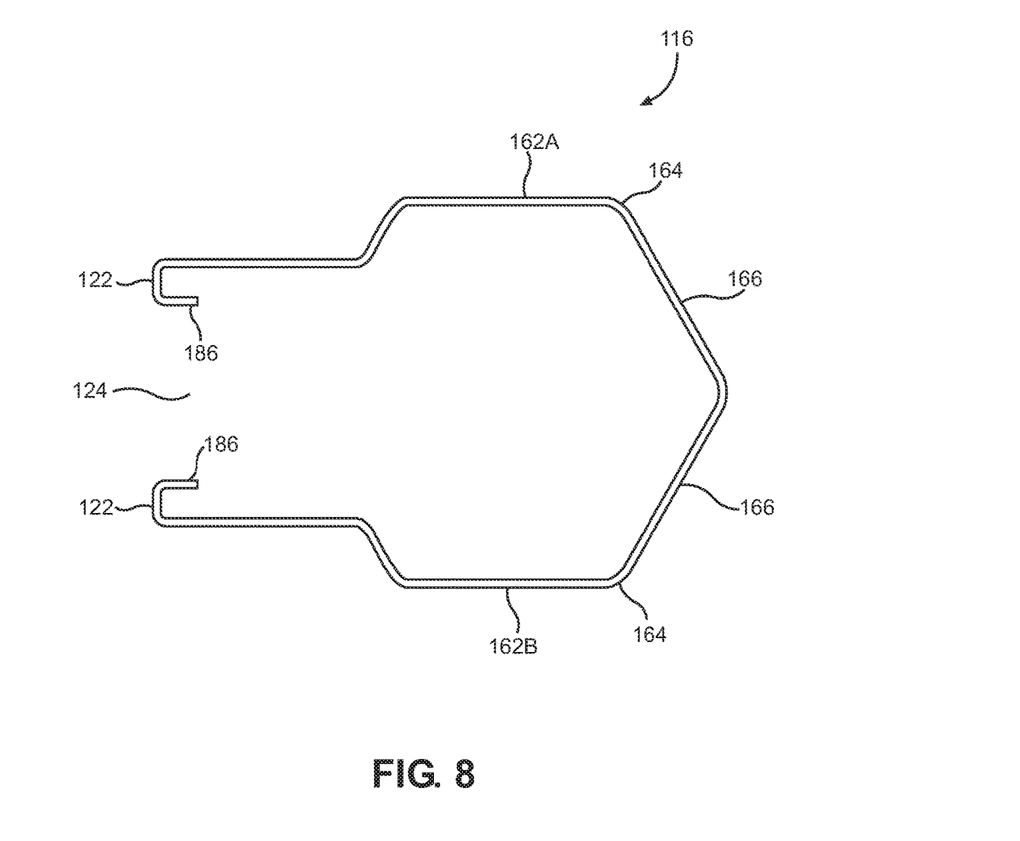
FIG. 8 is a plan view showing a guide rail according to an alternative embodiment.
Figure 9:
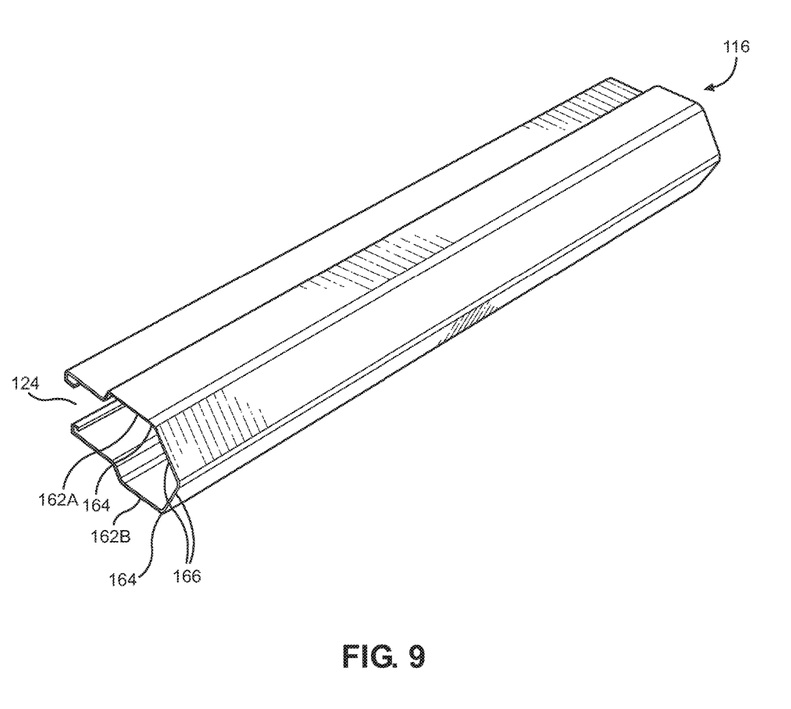
FIG. 9 is a perspective view showing the guide rail in FIG. 8.

The guide rail 116 also includes a flat back surface 166 that is located between the first and second side surfaces 162A, 162B and is disposed opposite from a nut rail or front slot 124. The back surface 166 is joined to the side surfaces 162A, 162B by outward bending curves 164. In certain embodiments, the back surface 166 may comprise two or more flat black surfaces joined together by outward bending curves 164 disposed between side surfaces 162A, 162B. Depending on the number and configuration of back surfaces 166 and side surfaces 162A, 162B, the side opposite from the slot 124 may be a flat surface or may be a curve surface. For example, as shown in FIGS. 3 and 4, the surface opposite from the slot 124 is flat. On the other hand, as shown in FIGS. 8 and 9, the surface opposite from the slot 124 is a curved surface. The length of the back surfaces 166 and the sides surfaces 162A, 162B may vary.

In this particular, the guide rail 116 includes two parallel extensions, which are referred to herein as front surfaces 120. The front surfaces 120 each include a first end 172 and a second terminal end 122. The first end 172 of each front surface 120 is joined to the side surface 162 by an inward bending curve 176. The second end 122 of each front surface 170 may terminate in a U-shaped outwardly-curving bend. The terminal ends 122 are spaced apart from one another along the entire length of the rail 116 from the top end 116A to the bottom end 116B. The spacing between terminal ends 122 provides a slot 124 that is sized to allow a bolt 126 to pass through but is narrow enough to prevent a nut 138 from passing through. In particular, the dimensions of the slot 124, including the size and spacing of the semicircular terminal ends 122, are designed to match industry-standard metal framing members (struts) so that standard-sized fittings, including nuts, hardware, etc., are readily available and so that workers are familiar with their function and use. For example, the slot 124 may be sized to match UNISTRUT® brand framing members, such as the P1000 series channel.

While the guide rail 116 depicted is hexagonal in shape, the precise number of sides is not especially critical. However, an important feature of this system 100 is that it may easily used as a replacement for tradition round piping. Accordingly, certain surfaces of the rail 116 are dimensioned to replicate the outer and inner diameter of circular pipes that are commonly used as guide rails for submersible pumps. For example, the distance between opposing interior flat sides 162, referred to herein as the first dimension D1, is dimensionally the same as the inner diameter (ID) of equivalent round pipes historically mounted to the pump base 104. Similarly, the distance between opposing bend curves 164, referred to herein as the second dimension D2, is dimensionally the same as the outer diameter (OD) of standard pipes. For example, the rails 116 may replicate an ASTM A53 Schedule 40 pipe. The size of the rail may be adjusted to replicate the size of larger or smaller pipes. For example, certain rails may be suited for a pipe having a nominal size of 2 inches, whereas others may be suited for a nominal size of 4 inches, etc.

Replicating the inner diameters of standard round pipes enables the rail 116 to be mounted to the pump 104 without the need for any additional hardware or significant modifications. By sizing the first dimension D1 appropriately, the rail 116 may be mounted to a top surface of the pump base 104 in the same way that the round pipes are mounted to the pump base. In particular, the rail 116 may be mounted to the pump base 104 by placing a bottom opening located at the bottom end 116B of the rail 116 onto a boss 114 that extends upwards from the pump base 104 and that has traditionally been sized for round pipes. The rail 116 then extends upwards from the submersible pump base 104 parallel with the discharge pipe 110 and is mounted near the vault access using a bracket 118. In this way, the guide rails 116 may be sized for any pump by ensuring that the first dimension D1 is equivalent to the inner diameter of the equivalent round pipes used.

Similarly, replicating the outer diameter of standard round pipes enables the rail 116 to be used in guiding pumps that have been traditionally guided by round pipes. In particular, as mentioned previously, receivers 160 located in the sides of pumps traditionally slide up and down along the round pipes in order to guide the pump to the desired location within the vault 102. The polygonal rails 116 may be used as a replacement for these round pipes by ensuring that the second dimension D2 is the same size as the outside diameter of the round pipes. This ensures that there is adequate contact between the receivers 160 and the rail 116 to safely guide the pump 106 into location.

One purpose of the guide rails 116 is to precisely guide the pump 106 to the desired location as it is lowered into the vault so that the pump and pump housing 104 are automatically mated together. In this particular embodiment, there are two parallel vertical rails 116 that are spaced apart from one another and that extend between the pump base 104 and the vault access 108. The pump 106 may be lowered through the vault access 108 and guided to its final location at the bottom end of the vault 102 along these rails 116. The rails 116 are precisely spaced apart such that receiver portions 160 of the pump 106 may be placed between the two rails. Alternatively, the receiver portion of the pump 106 may be placed around the outside of the two rails or placed around the outside of a single rail.

A receiver 160 similar to the one shown is generally located on or at the pump discharge, pump case or pump body to facilitate lowering the pump into the vault, as described above. The pump 106 is inserted over both the left and right rails 116 and then slides downwards to the desired location. The rails 116 guide the pump 106 as it is being lowered downwards into its final position to ensure that the pump is properly located and oriented with respect to the pump base 104 to ensure that the pump and the pump base automatically mate together.

Multiple rail sections arranged end-to-end may be required to span this entire length. Preferably, each rail section 116 is provided in standard lengths of about 8 feet. As mentioned previously, a disadvantage of using round pipe for guide rails is that pipe is often manufactured in very long sections that are expensive and are difficult to transport. Here, however, the polygon rails 116 are provided in shorter lengths that may be connected together. Another cost-saving advantage is that the rails 116 require less material to manufacture and, therefore, can be manufactured from a higher alloy (i.e., more corrosion resistant) material at a lower cost than the heavy wall lower alloy (i.e., less corrosion resistant) pipe. Thus, the rails 116 are able to better withstand the effects of harmful gases, such as $H_2S$ gas, which are commonly present in vaults.

Figure 5:
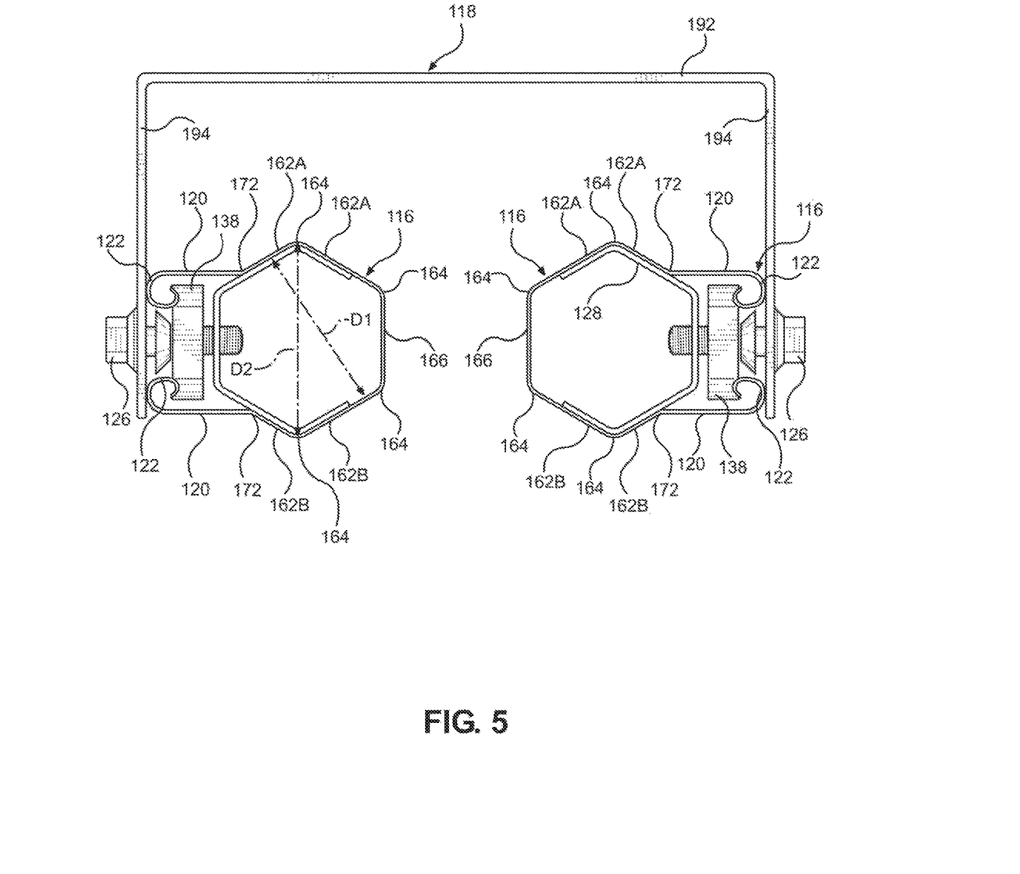
FIG. 5 is a plan view of a pair of guide rails including rail sleeves that are mounted to a bracket.

With reference to FIGS. 4 and 5, the rail sections 116 may be connected together using an internal elongate rail sleeve 128 that is designed for insertion into either the top end 116A or the bottom end 116B of each guide rail section 116. The rail sections 116 are connected so that the slots 124 of each rail section are aligned to form a single continuous slot along the entire length of the rails. The rail sleeve 128 includes a plurality of sides that define a polygonal cross section approximating the size and shape of the guide rail 116. The rail sleeve 128 has an interior space and interior edges 188, which define a slot 190 that extends between a top end and a bottom end of the sleeve. The slot 184 enables the sleeve to flex. The sleeve 128 may be moved from an un-flexed state to a flexed state by compressing the sides and narrowing the slot 184. Preferably, the internal rail sleeve 128 is slightly oversized when in an un-flexed state, such that it must be slightly squeezed together or flexed in order to be inserted into the guide rail sections 116. This pressure assists in forming a solid connection and in holding the internal rail sleeve 128 in place during construction.

Figure 6:
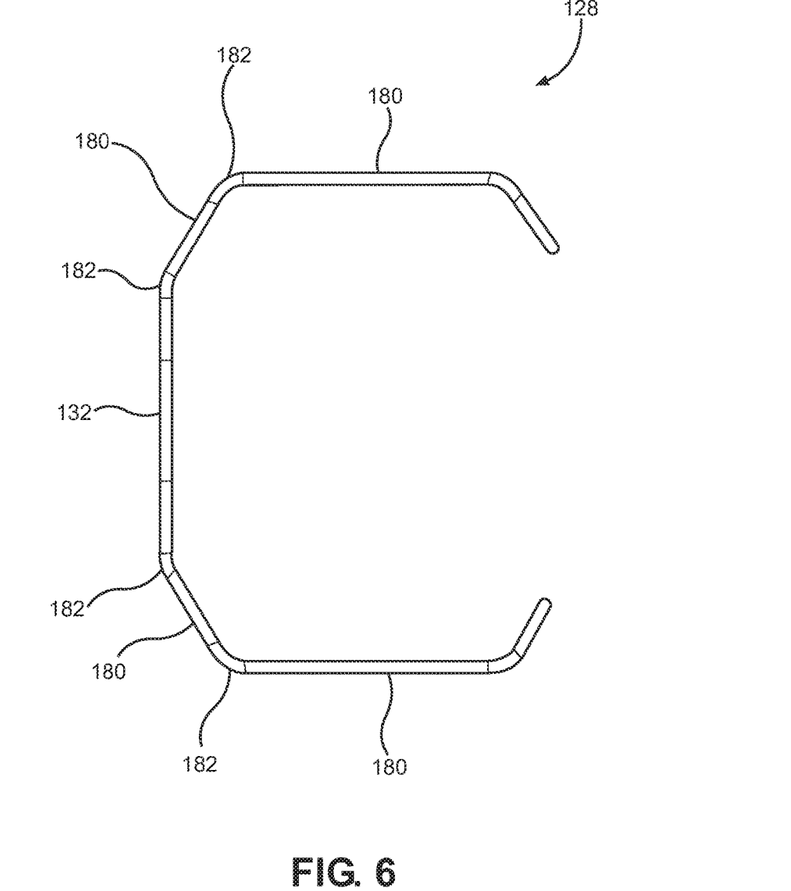
FIG. 6 is a plan view showing a rail sleeve according to an alternative embodiment.
Figure 7:
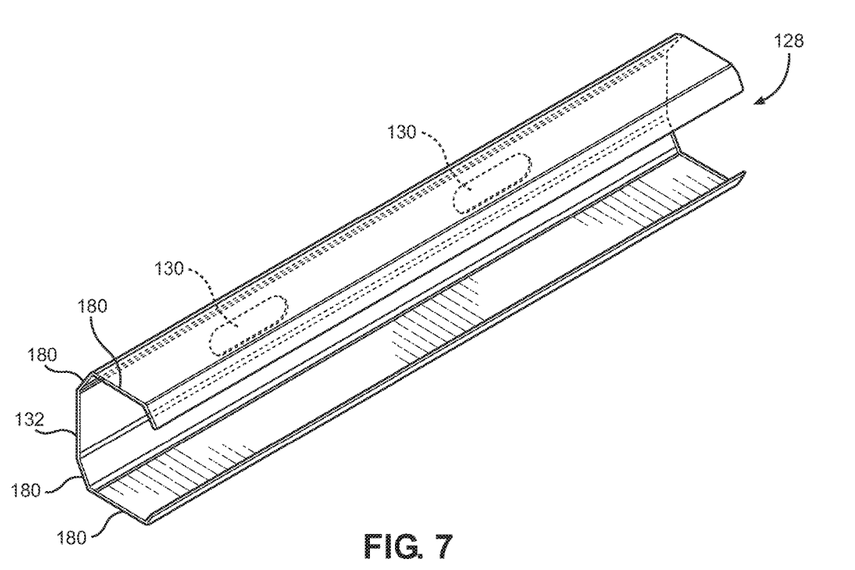
FIG. 7 is a perspective view showing the rail sleeve in FIG. 6.

In this particular embodiment, the rail sleeve 128 includes a two pairs of opposing flat side surfaces 180 joined together by outward bending curves 182. A flat back surface 132 is also joined to the sides 180 by outward bending curves 182. In certain embodiments, the back surface 132 may comprise two or more flat black surfaces joined together by outward bending curves 182 disposed between side surfaces 180. Additionally, as shown in FIGS. 6 and 7, the length of the back surfaces 132 and the side surfaces 180 may vary.

Preferably, the angle between adjacent surfaces of the sleeve 128 is between about 60 degrees and less than about 180 degrees. More preferably, the angle between adjacent surfaces of the sleeve 128 is between about 90 degrees and about 150 degrees. The back surface 132 is disposed opposite from a slot 184, which is formed between two of the sides 180. As least one surface of the sleeve, such as the back surface 132, includes a number of openings 130 disposed along its length. These openings 130 are disposed between the top end and the bottom end of the sleeve 128. As explained in greater detail below, the side of the sleeve with the openings 130 is positioned adjacent the slot 124 of the rail sections 116. This allows a connector, such as a bolt 126, to be inserted through the slot 124 and then into the opening 130 for the purpose of connecting the rail section 116 together with the sleeve 128.

In use, the internal rail sleeve 128 is partially inserted into the ends of two abutting rail sections 116 that are to be joined together. Since the sleeve 128 is internal, the ends of the rail sections 116 can be placed into abutting contact with one another. The slot 184 of the rail sleeve 128 is positioned opposite from the slot 124 of the rail sections 116. The pressure exerted by the slightly oversized rail sleeve 128 on the abutting rail sections 116 assists in keeping the rails sections in place. This forms one rail assembly. A second rail assembly is formed using the same method. The first and second rail assemblies are oriented parallel to one another and are placed onto the boss 114 of the pump base. Preferably, all rail section 116 are connected together before the rail assemblies are placed onto the boss 114. This allows the rail assembly to be placed into its final location without the need for personnel to be lowered into the vault 102.

A bracket 118 having a back surface 192 and left and right extensions 194 extending away from the left and right sides of the back surface, respectively, is connected to the first and second rail assemblies. The left and right extensions 194 of the bracket 118 each include two or more slots 134 that are sized so that at least a portion of the bracket slot 134 aligns with the rail slot 124. Preferably, the slots 134 on each side of the bracket 118 are in vertical alignment. The bracket is positioned along the outside of the rail sections 116 and is located so that at least one of the slots 134 of the bracket are located above and below the abutment of the two adjacent rail sections 116. One end of a bolt 126 is inserted through each of the slots 134 in the bracket 118. After the bolt 126 has been inserted into the slot 134, it then passes through the slot 124 in the rail section 116 and is threaded into a threaded strut nut 138. An example of a suitable strut nut 138 includes UNISTRUT®-brand channel nuts, which are compatible with the rail 116.

The tip of the bolt 126 is then inserted into the opening 130 in the rail sleeve 128. The threaded strut nut 138 engages with the terminal ends 122 of the rail section 116, which assists in preventing the strut nut from rotating while the bolt 126 is tightened. The bolt 126 then extends loosely through the openings 130 on the mounting side 132 of the rail sleeve 128 to additionally secure the rail sleeve 128 from moving out of position after assembly is complete. The same procedure is then repeated for the second rail section 116 located on the opposite side of the abutment of rail sections 116. This process may be repeated as necessary to connect additional rail sections 116 together to form a single rail of the desired length. Then, the process is again repeated on the opposite side of the bracket 118 in order to form the second rail 116.

The bracket 118 may be used simply to connect rail sections 116 together as discussed above. However, sometimes a portion of the bracket 118 may also be connected to another stable surface in order to provide additional structural support to the rails 116. For example, as shown in FIG. 2, brackets 118 may be connected to the discharge pipe 110. This connection may be made, for example, through the use of a strap 140. The strap 140 may be bolted or welded to a back surface of the bracket 118 opposite the rails 116. The strap 140 may then be fitted around the discharge pipe 110. Additionally, the bracket 118 may also be used to fix the top end of the rails 116 near the vault access 108. To make this connection, bolts may be inserted through holes formed in the middle section of the C-shaped bracket 118 between the rails 116 and then driven into a wall of the vault access 108.

A further benefit of the rails 116 is that other hardware and devices may be quickly and easily affixed to the slot 124 using the same hardware that is used to affix the brackets 118 to the rail in the manner described above. Then accessories and hardware, such as pump lifting chains and pump power cables, may be suspended from slot 124, which saves time and energy during construction and may be safer during future maintenance activities.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the invention in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A combined rail and rail mounting system for use in guiding a submersible pump to a pump base, the system comprising: an elongate first guide rail having a top end and a bottom end, the first guide rail being defined by a plurality of planar sides joined together at bending curves to provide an open-sided, hexagonal-shaped elongate exterior pump guide surface and a hexagonal-shaped interior space; a mounting member adjacent to an opening in the first guide rail, the opening extending between the top and bottom ends of the first guide rail, the mounting member comprising spaced-apart, parallel sides attached to and extending outwards from the first guide rail, each of the parallel sides having a contact area at a terminal end thereof, wherein the opening is between the spaced-apart, parallel sides and is sized so that a fastener can pass through the opening and the contact area is sized so that a nut contacts the contact area and is prevented from passing through the opening in the first guide rail; wherein the submersible pump is guided on the exterior surface of the elongate first guide rail.

2. The system of claim 1 wherein at least two of the plurality of planar sides, located on opposite sides of the interior space, are oriented parallel to one another.

3. The system of claim 2 wherein the plurality of planar sides is joined together at bending curves and wherein at least two bending curves are positioned directly across the interior space from one another such that a line drawn between the at least two bending curves passes through a center of the interior space.

4. The system of claim 3 wherein outer surfaces of the at least two bending curves are spaced apart by a second distance D2 measured across the center of the interior space that is equivalent to an outer diameter of a round pipe such that the elongate first guide rail may be used as a substitute for the round pipe.

5. The system of claim 1, wherein the plurality of planar sides comprises:
  a back side disposed opposite the opening such that the interior space is located between the back side and the opening;
  a first side mounted to a first end of the back side; and
  a second side mounted to a second end of the back side.

6. The system of claim 5 wherein:
  the first side is comprised of at least two first side surfaces joined together; and
  the second side is comprised of at least two second side surfaces joined together.

7. The system of claim 1 further comprising:
  an elongate rail sleeve defined by a plurality of planar sides joined together at bending curves to provide an open-sided, hexagonal-shaped rail sleeve that approximates the shape of the first guide rail,
  wherein the rail sleeve is configured for insertion into the interior space of the first guide rail, and
  wherein sides of the first guide rail adjacent the opening thereof contact sides of the rail sleeve to prevent the rail sleeve from being pulled out of the interior space of the first guide rail via the opening of the first guide rail.

8. The system of 7 further comprising an opening that extends between top and bottom ends of the rail sleeve and is formed between first and second edges of two opposing sides of the plurality of sides of the rail sleeve.

9. The system of claim 8 wherein the rail sleeve may be moved from an un-flexed state to flexed state by compressing the plurality of sides and narrowing the opening therein, and wherein the rail sleeve is configured for insertion into the interior space of the guide rail via an end of the guide rail when in the flexed state but is too large for insertion into the guide rail when in the un-flexed state.

10. The system of claim 7 further comprising a second elongate guide rail having a top end and a bottom end, the second guide rail being defined by a plurality of planar sides joined together at bending curves to provide an open-sided hexagonal-shaped elongate exterior pump guide surface and a hexagonal-shaped interior space, wherein the rail sleeve is partially inserted into the top end of the of the first guide rail and partially inserted into the bottom end of the second guide rail for removably connecting the second guide rail end-to-end to the first guide rail.

11. The system of claim 7 comprising;
  an aperture formed in a side of the sleeve opposite an opening therein; and
  a connector passing through the opening in the first guide rail and into the aperture in the sleeve in order to locate the sleeve at a desired vertical position along the length of the guide rail.

12. The system of claim 8 further comprising:
  a mounting surface configured to mount to the mounting member for fixedly mounting the first guide rail at a selected location;
  a mounting opening formed in the mounting surface;
  a connector having a threaded end that is passed through the mounting opening of the mounting surface and the opening of the mounting member;
  a nut threaded onto the threaded end of the connector, wherein the nut contacts the contact area and pulls the mounting member against the mounting surface as the nut is threaded onto the threaded end.

13. The system of claim 1 wherein the terminal end of each of the parallel sides of the mounting member bend in a U-shape into a space located between the parallel sides of the mounting member and then back towards the interior space of the first guide rail.

14. A fluid containment and pump system comprising: an enclosure for holding a fluid; a pump base fixedly mounted within the enclosure; a pair of guide rail bosses disposed on a top portion of the pump base; a pair of elongate first guide rails, each guide rail having a top end and a bottom end, and each guide rail being defined by a plurality of planar sides joined together at bending curves to provide an open-sided, hexagonal-shaped elongate exterior pump guide surface and a hexagonal-shaped interior space; a mounting member adjacent to an opening in each of the guide rails, the opening extending between the top and bottom ends of the guide rails, the mounting member comprising spaced-apart, parallel sides attached to and extending outwards from each of the guide rails, each of the parallel sides having a contact area at a terminal end thereof, wherein the opening is between the spaced-apart, parallel sides, each of the parallel sides having a contact area at a terminal end thereof, wherein the opening is sized so that a fastener can pass through the opening and the contact area is sized so that a nut contacts the contact area and is prevented from passing through the opening in each of the guide rails; a receiver mounted to the pump and having a pair of openings for receiving the guide rails, wherein the receiver is configured to slide along an exterior surface of the pair of guide rails for guiding the pump to the pump base and to correctly position the pump with respect to the pump base and to automatically mount the pump to the pump base, wherein at least two of the plurality sides of each guide rail are oriented parallel to one another and inner surfaces of the at least two sides are spaced apart by a first distance D1 measured across a center of the interior space that is approximately equal to an outer diameter of the guide rail boss such that the bottom end of the guide rail may be inserted over the guide rail boss, and wherein outer surfaces of at least two bending curves are spaced apart by a second distance D2 measured across the center of the interior space that is equivalent to a width of the receiver opening.

15. The system of claim 14 further comprising:
a bracket mounted to a fixed surface within the enclosure, wherein the pair of guide rails are fixed in a desired location within the enclosure by being mounted to the bracket.

16. The system of claim 14 further comprising:
a pair of elongate rail sleeves, each rail sleeve being defined by a plurality of sides joined together at bending curves to provide an open-sided, hexagonal-shaped rail sleeve that approximates the shape of the first guide rails such that the rail sleeves may be inserted into the interior space of the first guide rails; and
a pair of elongate second guide rails, wherein each of the rail sleeves is partially inserted into the top end of each of the of the first guide rails and partially inserted into the bottom end of each of the second guide rails for removably connecting the second guide rails end-to-end above the first guide rails.

* * * * *